United States Patent

Dixon et al.

[11] Patent Number: 5,935,206
[45] Date of Patent: Aug. 10, 1999

[54] AUTOMATIC REPLICATION OF DIGITAL VIDEO AS NEEDED FOR VIDEO-ON-DEMAND

[75] Inventors: Peggy Pak-Fan Dixon, Austin, Tex.; John Leslie Harter, Cary, N.C.; Timothy Peter Krein; Michael John Morton, both of Endicott, N.Y.; Frederick Aaron Schwartz, Wake Forest, N.C.

[73] Assignee: International Business Machines Corporation, Armonk, N.Y.

[21] Appl. No.: 08/766,266

[22] Filed: Dec. 13, 1996

[51] Int. Cl.⁶ .................................................. H04N 7/10
[52] U.S. Cl. ................................................. 709/219; 348/7
[58] Field of Search ..................................... 348/1, 2, 3, 7; 455/3.1, 4.1, 4.2, 5; 395/200.3, 200.42, 556, 200.44, 200.45, 200.49

[56] References Cited

U.S. PATENT DOCUMENTS

| | | |
|---|---|---|
| 5,168,353 | 12/1992 | Walker . |
| 5,311,423 | 5/1994 | Clark . |
| 5,453,779 | 9/1995 | Dan et al. ............... 455/4.2 |
| 5,461,415 | 10/1995 | Wolf et al. . |
| 5,473,362 | 12/1995 | Fitzgerald et al. . |
| 5,475,615 | 12/1995 | Lin . |
| 5,508,732 | 4/1996 | Bottomley et al. . |
| 5,512,934 | 4/1996 | Kochanski ................ 455/4.2 |
| 5,519,435 | 5/1996 | Anderson . |
| 5,530,557 | 6/1996 | Asit et al. ................. 348/7 |
| 5,561,456 | 10/1996 | Yu ............................ 348/7 |
| 5,561,637 | 10/1996 | Dan et al. ................. 348/7 |
| 5,568,180 | 10/1996 | Okamoto et al. ......... 348/7 |
| 5,583,561 | 12/1996 | Baker et al. .............. 348/7 |
| 5,606,359 | 2/1997 | Youden et al. ........... 348/7 |
| 5,682,597 | 10/1997 | Ganek et al. ............ 455/4.2 |
| 5,689,299 | 11/1997 | Isono et al. .............. 348/7 |
| 5,758,151 | 5/1998 | Milligan et al. ......... 395/611 |
| 5,793,971 | 8/1998 | Fujita et al. ............. 395/200.49 |
| 5,802,310 | 9/1998 | Rajamaraman ......... 395/200.64 |
| 5,815,662 | 9/1998 | Ong ......................... 395/200.49 |

FOREIGN PATENT DOCUMENTS

0683464  11/1995  European Pat. Off. .

*Primary Examiner*—Andrew I. Faile
*Assistant Examiner*—Reuben M. Brown
*Attorney, Agent, or Firm*—Arthur J. Samodovitz

[57] ABSTRACT

A server and method allocates access to a digital video movie to clients for viewing upon demand. The server receives requests to view the movie and in response, compares a number of requests to concurrently view the movie to a threshold. If the number is less than the threshold, the server allocates access for a current request to an existing copy of the movie stored on one or more disks, using bandwidth previously reserved from the one or more disks for the movie. However, if the number exceeds the threshold, the server automatically reserves additional bandwidth for future viewers if available from the one or more disks for the movie. But, if the number exceeds the threshold but such additional bandwidth is not available, the server makes another copy of the movie on another disk provided the copy can be made before the most advanced viewer completes its viewing.

23 Claims, 5 Drawing Sheets

AUTOMATIC REPLICATION OF DIGITAL VIDEO AS NEEDED FOR VIDEO-ON-DEMAND

BACKGROUND OF THE INVENTION

The invention relates generally to access to data stored in computer systems, and deals more particularly with managing video data stored on disk to supply video-on-demand application.

Currently, "pay-per-view" movies are available via "Cable Television". The Cable Television supplier makes the pay-per-view movies available at pre-determined times, and subscribers can register to view the movie at the pre-determined times. At those times, the Cable Television supplier transmits the movie via the normal television cable on a special channel reserved for the pay-per-view movies. All subscribers of the pay-per-view movie receive the movie at the same time on the same channel. While this is an effective way to supply a movie to subscribers, many subscribers do not want to be limited as to viewing times; they want to view the movie at a time of their choice.

"Video-on-demand" refers to the furnishing of a video movie to viewers via a computer network at times selected by each viewer and under the control of the viewer. One or more copies of the movie are stored, each on a separate direct access storage device (DASD) such as disk. Upon request by the viewer, the viewer is granted access to a copy of the movie and can begin to read the movie. A pointer tracks the progress of the viewer.

There is a limit to the number of viewers that can be supplied from each disk. This limit is based on the bandwidth available for reading the movie from the disk to a server and the bandwidth available for transmitting the movie from the server to the viewer. Usually, the bandwidth available for the server to access the disk is the limiting factor as a single disk is typically used to supply ten to twenty viewers. The bandwidth available for accessing the disk is limited by the mechanical motion required by a disk read head and the disk itself.

Each copy of a typical video movie requires a large amount of disk storage and this storage is expensive to provide. Consequently, it is desirable to minimize the number of copies yet accommodate viewer requests and do so promptly. At the start of service, enough copies of the movie are made on different disks and enough bandwidth is reserved on these disks to satisfy an expected number of concurrent viewers. It was known for an operator to track the number of viewers of each movie. When the number of current viewers increases to a pre-determined percentage of the total expected number, then the operator may request that additional bandwidth be reserved on the disk(s) that already contain copies of the movie, provided that additional bandwidth is available, or that another copy be made on another disk.

European Patent Application 95102075.9, Publication Number 0 683 464 A2 discloses a video-on-demand system. There are multiple copies of the same movie on different disks, and each disk contains copies of different movies. The computer system monitors the number of video movies being read concurrently from each disk and balances the loads on the disks by transferring the reading of a movie from an overloaded disk to another, underloaded disk containing a copy of the same movie. The computer system also periodically transfers movies between the disks to optimize load balancing based on the user performance requests for each of the video movies.

A general object of the present invention is to provide a video-on-demand system which automatically tailors the number of copies of movies and allocated bandwidths to viewer requirements.

Another general object of the present invention is to provide a video-on-demand system of the foregoing type which promptly provides requesters with access to movies.

SUMMARY OF THE INVENTION

The invention resides in a server and method for allocating access to a digital video movie to clients for viewing upon demand. The server receives requests to view the movie and in response, compares a number of requests to concurrently view the movie to a threshold. If the number is less than the threshold, the server allocates access for a current request to an existing copy of the movie stored on one or more disks, using bandwidth previously reserved from the one or more disks for the movie. However, if the number exceeds the threshold, the server automatically reserves additional bandwidth if available from the one or more disks for the movie. But, if the number exceeds the threshold but such additional bandwidth is not available, the server makes another copy of the movie on another disk.

According to one feature of the invention, the server determines whether to make another copy of the movie based in part on degree(s) to which current viewer(s) have completed their viewing of the movie. If the copy could not be made before the most advanced viewer completes its viewing, then there is no advantage to making the copy.

DETAILED DESCRIPTION OF THE PREFERRED EMBODIMENTS

Figure 1:
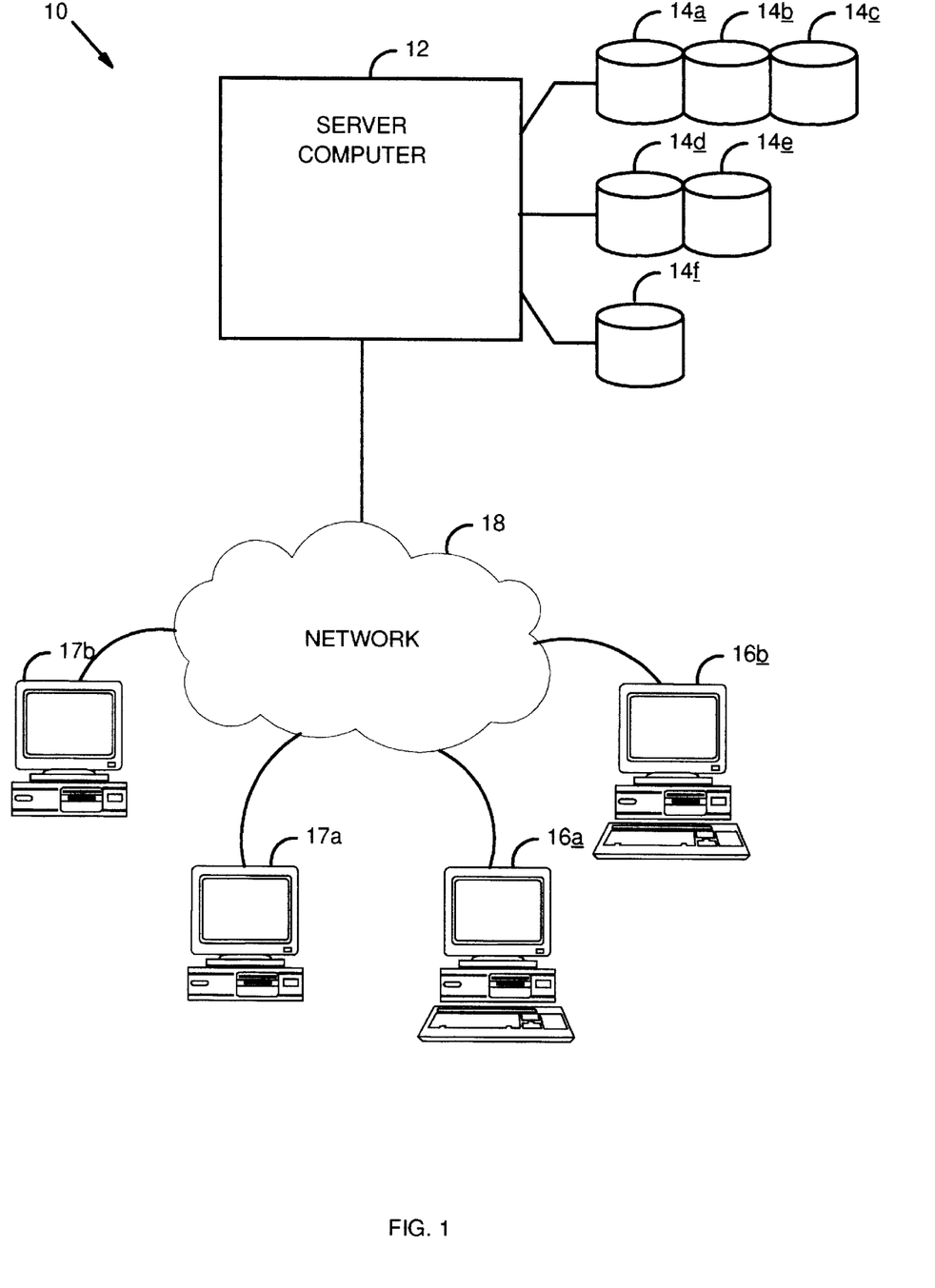
FIG. 1 is a diagram of a computer network with subscribers to video-on-demand, DASD which stores copies of video movies and a video server computer according to the present invention.

Referring now to the drawings in detail wherein like reference numbers indicate like elements throughout, FIG. 1 illustrates a video-on-demand network generally designated 10 according to the present invention. Network 10 comprises a video server 12 with multiple DASDs 14a–f and a network 18. Viewers are connected to the network by workstations 16a,b or televisions 17a,b with set-top boxes. Each set-top box includes controls to select and control viewing of the movies. By way of example, server 12 is a main frame computer or computer workstation and the network 18 comprises front-end processors, routers, switches, etc. which guarantee bandwidth which has been reserved between the workstations 16a,b and televisions 17a,b and the server 12. Each DASD is a high-speed disk storage system which may store each movie on a single disk or "stripe" a movie on multiple physical disks to expedite access.

Figure 2:
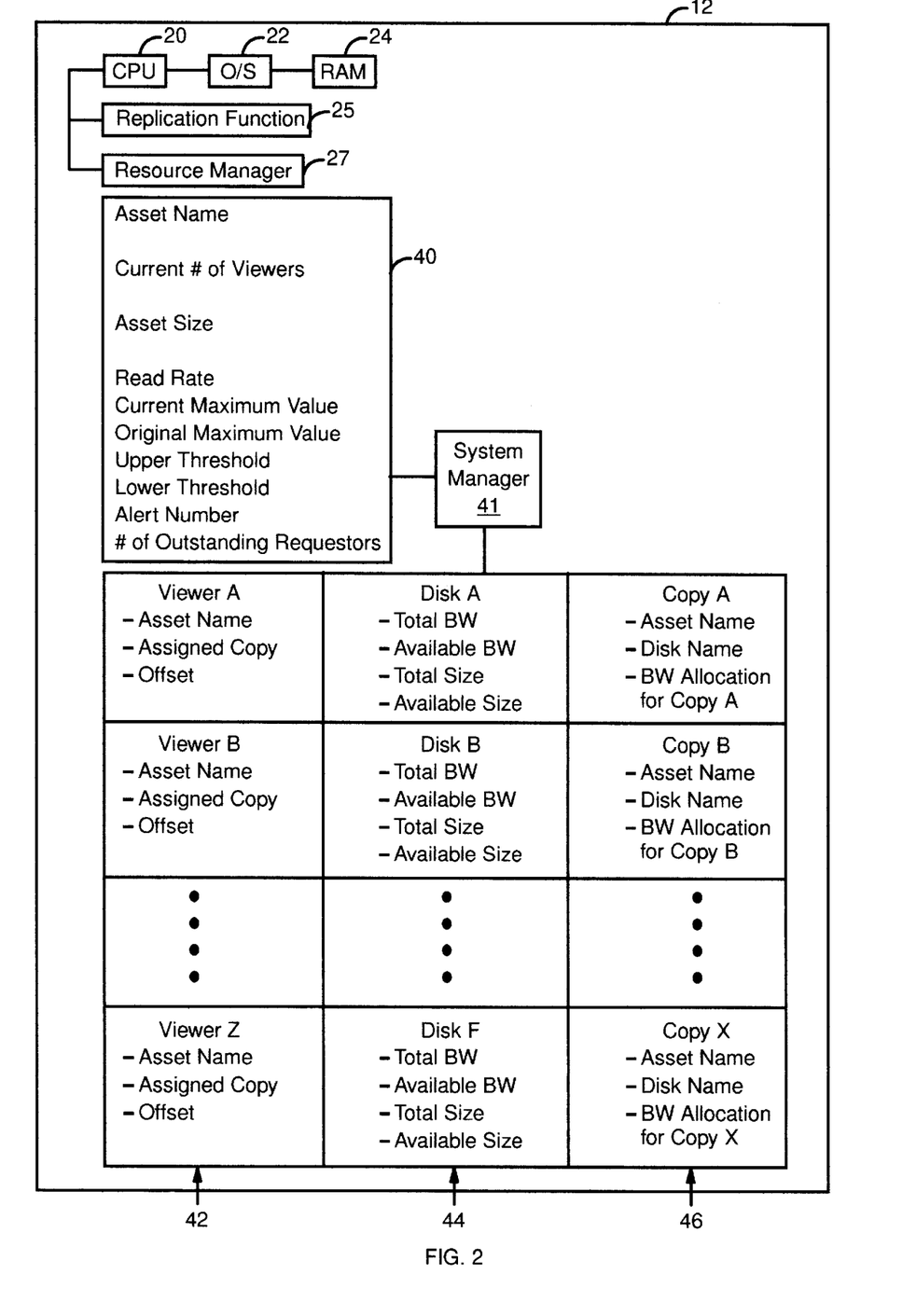
FIG. 2 is a more detailed diagram of components of the video server of FIG. 1.

FIG. 2 illustrates the components of server 12 in more detail. Server 12 comprises general purpose computer hardware and software including a CPU 20, an operating system 22 and a RAM 24. In addition server 12 includes an asset manager 27 for selecting which copy of an asset (for example, a digital movie) to assign to a viewer. Server 12 also includes a replication function 25 to determine when and where to replicate an existing asset to satisfy increased demand. Server 12 also maintains multiple tables 40, 42, 44 and 46 to record data about each asset, viewer, disk and asset copy, respectively.

Asset table 40 indicates the name of the asset, the current number of viewers of the asset, the size in bytes of the asset, the rate at which a copy of the asset is read, a value for the maximum number of viewers expected at any one time, an upper threshold number of viewers for the asset at which the server considers making another copy, a lower threshold number of viewers at which the server considers decreasing the value for the maximum number of viewers and the corresponding number of copies of the asset, an alert number used to determine when another copy of the asset should be made and the number of outstanding requesters for the asset.

A system manager 41 tracks current viewers of each movie and the upper and lower thresholds specified for each movie. The system manager issues alerts when the number of current viewers of each movie exceeds the upper threshold for the movie. The system manager also notes when the current number of viewers falls below the lower threshold for the movie.

Viewer table 42 indicates each viewer identification, the name of the asset currently being viewed by the viewer, the copy assigned to the viewer and the point in the copy (or "offset") at which the viewer is currently viewing.

Disk table 44 indicates the name of each disk, the total bandwidth of the disk, the bandwidth currently available from the disk, the total size of the disk in bytes and the available size in bytes of the disk.

Copy table 46 includes an identification of each copy, the name of the asset, the name of the disk containing the copy and the bandwidth allocated for the copy from the disk.

Figure 3:
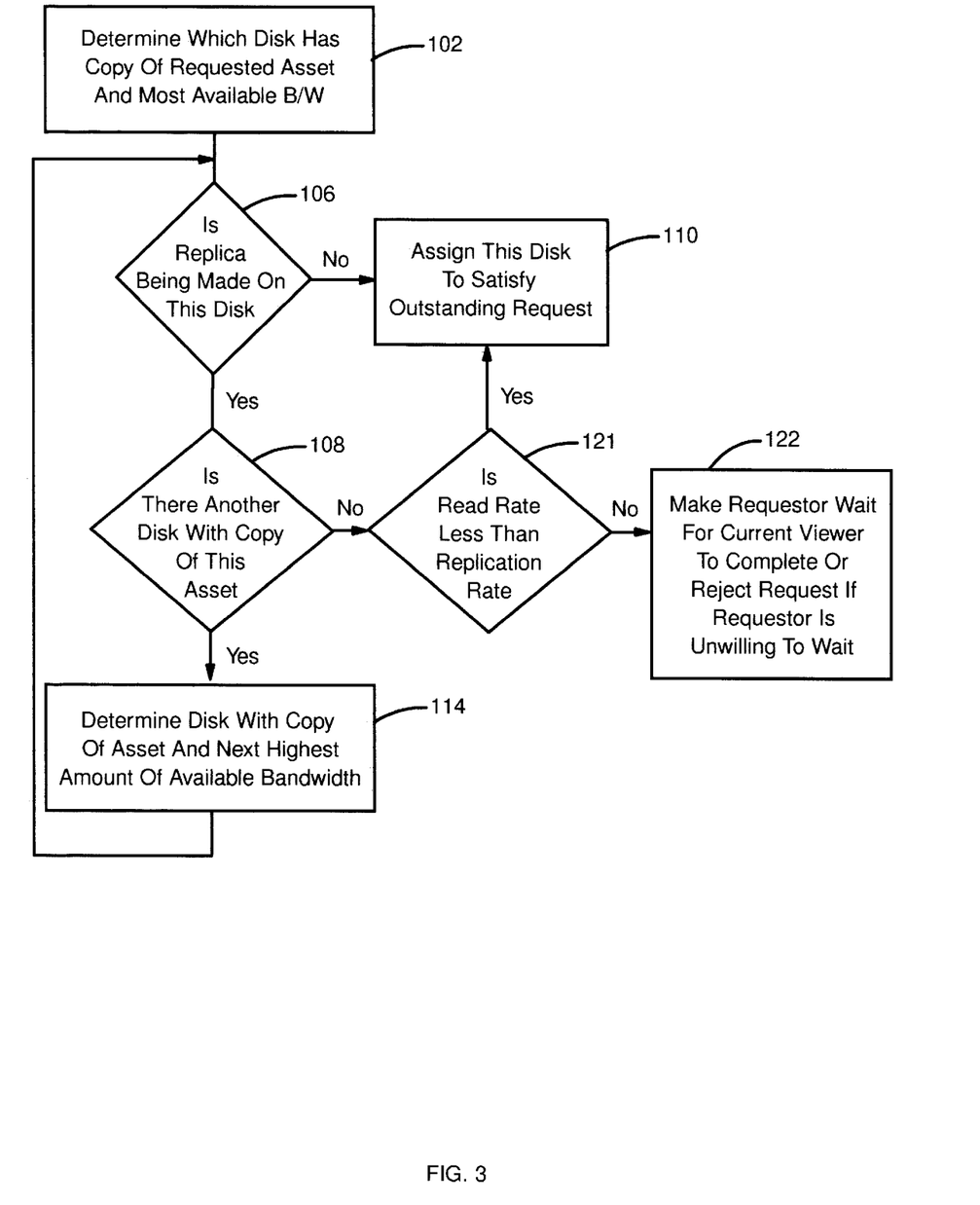
FIG. 3 is a flow chart of an asset manager program function within the video server of FIG. 1.

FIG. 3 illustrates processing by asset manager function 27 which is in charge of assigning an existing copy of an asset to satisfy a view request. Whenever a new request is received to view an asset, the asset manager 27 determines from table 46 which disks contain a copy of the asset. Then, from a seperate table 44, the asset manager determines what percentage of each disk's bandwidth is currently being used (step 102). The asset manager 27 then determines which disk has the most bandwidth available for viewing (step 102). Then, the asset manager 27 determines if that disk is currently replicating the disk from another disk (decision 106). If not, then the asset manager 27 assigns this disk as the source of the asset to satisfy the current request (step 110). However, if this disk is currently replicating the asset, then asset manager 27 determines if there is another disk with a copy of this asset (decision 108), and if so, identifies the disk with the next highest amount of available bandwidth (step 114). The asset manager next proceeds to decision 106 which will likely lead to step 110 whereby this disk with the next highest amount of its bandwidth currently available will be assigned to satisfy the current request. Referring again to decision 108, if there is no disk other than the disk where the asset is currently being replicated, then the replicating asset will be assigned to satisfy the current request if the asset is being replicated faster than the normal read rate (step 121). The normal read rate is a function of the asset itself and is pre-determined while the replication rate is a function of the available bandwidth of the source and target disks. The system must be able to read the asset for the viewer at the same time as it writes the asset during replication. In addition, the replication must have completed writing enough of the movie to the disk so that the system can fill its read-ahead buffers for the viewer. In the case where the replication rate is faster than the normal read rate, the viewer will not likely "catch-up" to the replication so the copy currently being replicated will suffice for the requester. However, if the asset is not being replicated faster than the normal read rate, then no asset copy is assigned, and the requestor is forced to wait (step 122).

Figure 4:
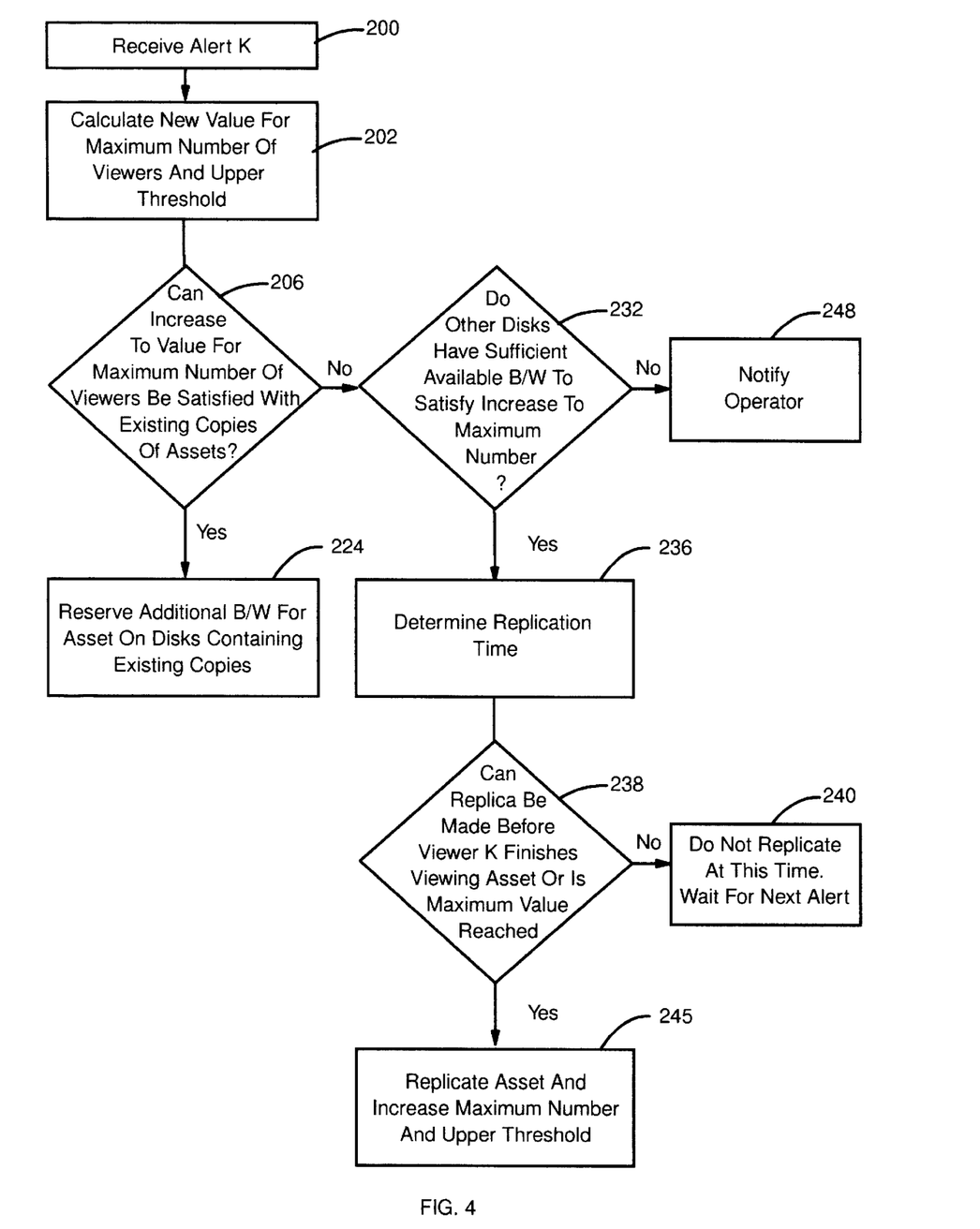
FIG. 4 is a flow chart of a replication program function within the video server of FIG. 1.

FIG. 4 illustrates processing by the replication function 25 to determine when to make another copy of an asset to satisfy new requests. As illustrated by table 40 of FIG. 2, an upper threshold is established to define a number of viewers that can view the existing copy(ies) of an asset before the replication function considers replicating the asset, i.e. making another copy, for subsequent viewers. The upper threshold can be a pre-determined number of viewers or a pre-determined percentage such as 80% of the maximum number of viewers that can concurrently access the existing copies of the asset. The maximum number is based on the bandwidth available for accessing all existing copies of the asset (from all disks). By way of example, the maximum number of viewers of the asset is 100 and the upper threshold is 80 viewers. As the asset manager receives each new request to view the asset, the asset manager calculates the total number of current viewers plus the total number of outstanding requests. If that number is less than the upper threshold, then the asset manager assigns an asset copy to satisfy the request without notifying the replication function; there is no need to consider making any additional copies. However, if that number equals or exceeds the current upper threshold, then the system manager alerts the replication function and sets a parameter "K" equal to the excess. As noted above, the number of current viewers is also recorded in table 40. In the foregoing example, when there are 79 current viewers and another request is made to view the same asset, then an alert is sent to the replication function (step 200). In this case, k=1 because this is the first alert. "K" equals the number of requests to view the movie plus one minus the upper threshold. In response to the alert, the replication function calculates a new, maximum value for the number of possible viewers and a corresponding new value for the upper threshold (step 202). By way of example, the replication function increases each by 25% so the new calculated value for the maximum viewers is 125 and the new calculated upper threshold is 100. However, at this time it is not known whether the existing disks containing existing copies of the asset can provide this additional bandwidth; the foregoing calculated values are just desired targets. Therefore, the next step is for the replication function to determine whether the existing copies can handle these targets by determining from table 46 which disks contain copies of the asset and which of these disks have bandwidth available and calculating if the available bandwidth is sufficient to satisfy the increase to the target maximum value (decision 206). If there is sufficient, additional bandwidth available, then the replication function reserves this bandwidth from the disks for the asset and increments table 40 accordingly (step 224). If there is more than one disk with available bandwidth to choose from, then the replication function allocates from one or more of the disks to balance the total bandwidth utilization of the disks.

Referring again to decision 206, if the new values for maximum number of viewers cannot be satisfied from the disk(s) containing the existing copies of the asset, then the replication function determines from table 44 which disks have bandwidth available and do not currently have a copy of the asset (decision 232). For each disk which has sufficient bandwidth available to satisfy the increase to the maximum number of viewers calculated in step 202, the replication function determines the time required to make a copy of the asset to that disk (step 236). The replication time equals the size of the asset in bytes divided by the copy rate in bytes per second. The copy rate is the lesser of the bandwidth reserved for replication on the source disk and the bandwidth reserved for replication on the target disk. Next, the replication function compares the replication time to the time required for the most advanced viewer (for k=1) to complete its viewing. The time required for each current viewer to complete its viewing is computed by subtracting its current point in viewing from the total viewing time for the asset and increasing the result by a "delay" factor. The "delay" factor represents an average amount of viewer controlled stops and pauses. If the time required to replicate the asset is greater than the time required for the most advanced viewer (for k=1) to complete its viewing, then replication is not begun at this time (decision 238 and step 240). There is no need to begin a replication at this time because another copy will not reduce the load on the existing copies for a subsequent viewer; by the time the new copy would be complete, the load on the existing copies will be reduced by one to accommodate a subsequent viewer.

Referring again to decision 238, if the replica can be made before the most advanced viewer completes its viewing or if the total number of current viewers and outstanding requests to view the asset equals the value for the maximum number of viewers in effect before step 202, then the asset is replicated to the disk identified in step 236 and the maximum number of viewers and upper threshold is updated in table 40 according to the targets calculated in step 202 (step 245). The latter criterium is important because if the total number of current viewers and outstanding requests to view the asset equals the value for the maximum number of viewers in effect before step 202 then another copy will be needed regardless of whether the replica can be made before the most advanced viewer completes its viewing. The copy must be made at this time because the next viewer's request will need to read from it.

Referring again to decision 232, if no other disks have enough available bandwidth to satisfy the increase to the maximum number of viewers calculated in step 202, then the replication function notifies an operator (step 248). The operator may then choose to obtain additional disks or reconfigure the system to free up a disk to accept another copy.

Consider now an example where there are 80 current viewers and the upper threshold is 80; no additional copy of the asset was made pursuant to the last request to view the asset because the most advanced viewer was soon to complete its viewing. In this example, another request is made to view the asset so the system manager sets k=2 and notifies the replication function. Steps 200, 202, 206, 224, 231, 232 and 236 are performed as described above; however decision 238 is performed differently. The question in decision 238 is whether the second (i.e. kth) most advanced reader will complete its viewing before the replication can be made (or whether the total number of current viewers and outstanding requests exceeds the maximum value for the asset). During this iteration of the processing of FIG. 4, it is not necessary to again consider the viewing point of the most advanced viewer compared to the replication time because that was considered in the preceding iteration and found not to warrant replication. However, during this iteration of the processing of FIG. 4, if the second most advanced reader will complete its viewing before the replica can be made then there again is no advantage gained by replicating the asset (unless the total number of current viewers and outstanding requests equals the maximum value for the asset). If the second most advanced reader will not complete its viewing before the replica can be made or the total number of current viewers and outstanding requests exceeds the maximum value for the asset then the replica is begun (step 245).

Figure 5:
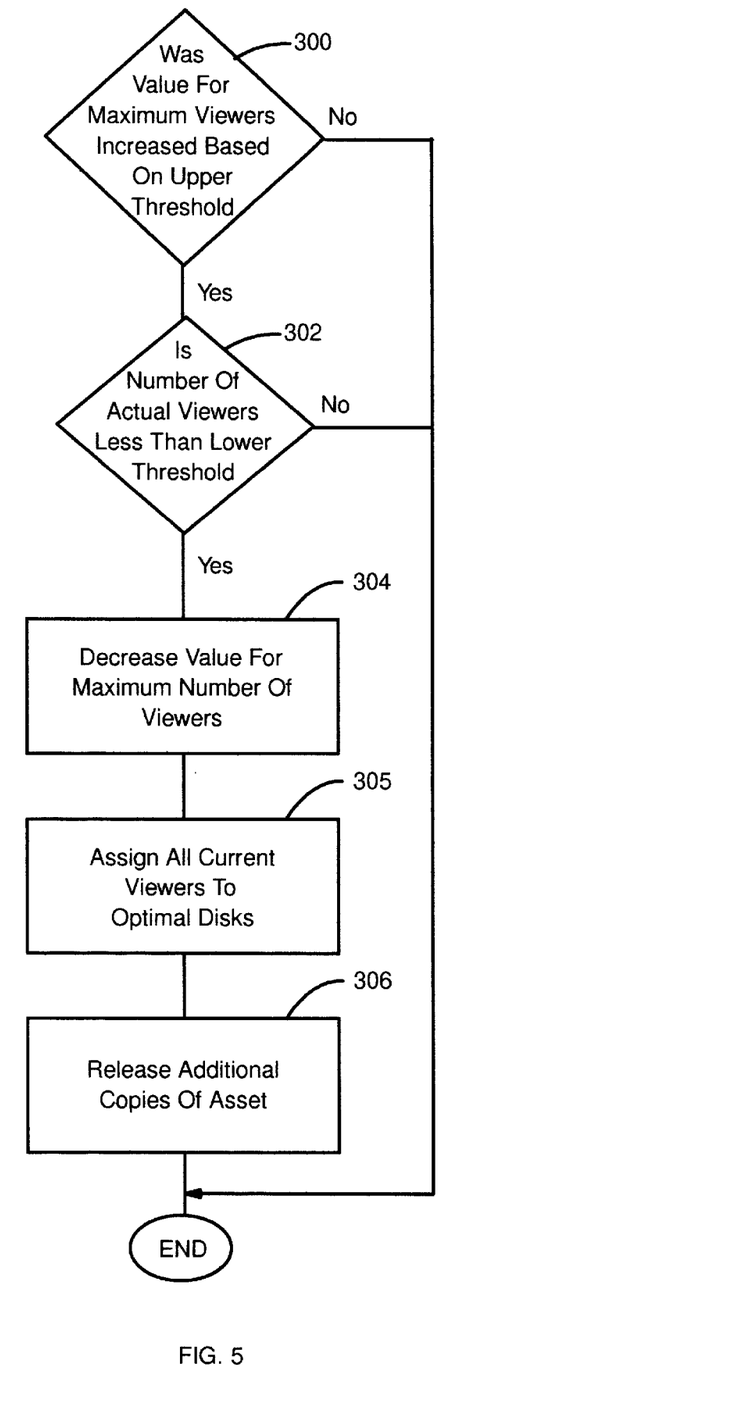
FIG. 5 is a flow chart of another function performed by the replication program function within the video server of FIG. 1.

Replication function 25 also executes the process of FIG. 5 whenever a viewer finishes watching a movie to determine if the current value for the maximum number of viewers for each asset stored in the asset tables is still warranted. In decision 300, the replication function determines from table 40 whether the current value for the maximum number of viewers is greater than the original value. If not, then no changes are made to the value for the maximum number in table 40. However, if the current value is greater than the original value, then the replication function compares the current number of actual viewers recorded in table 40 to the lower threshold also recorded in table 40 (decision 302). If the current number of viewers is greater than the lower threshold, then the replication function does not change the value for the maximum number in table 40. However, if the current number of viewers is less than or equal to the lower threshold, then the replication function decreases the current value of the maximum number of viewers to the original value (step 304). Also, the replication function determines which disks should continue to contain a copy of the movie based on current system usage (step 305), and deletes the other copies which are no longer necessary (step 306).

Based on the foregoing, a computer server according to the present invention has been disclosed. However, numerous modifications and substitutions can be made without deviating from the scope of the present invention. Therefore the present invention has been disclosed by way of illustration and not limitation and reference should be made to the following claims to determine the scope of the present invention.

What is claimed is:

1. A computer server for allocating access to a digital video movie to clients upon demand, said server comprising:
   means for allocating access to an existing copy or existing copies of a digital video movie to clients to satisfy requests to view said movie; and
   means, responsive to substantial allocation of access to said existing copy or copies of said movie or a new request to view said movie, for determining whether to make another copy of said movie based in part on the degree to which current viewer(s) have completed their viewing of said movie and a time required to make said other copy.

2. A computer server as set forth in claim 1 wherein the determining means determines whether to make said other copy of said movie based on a comparison of an estimated time required for an advanced viewer to complete its viewing of said movie to a time required to make said other copy of said movie.

3. A computer server as set forth in claim 2 wherein the determining means determines to make said other copy of said movie if the time required to make said other copy is less than the time required for said advanced viewer to complete its viewing.

4. A computer server as set forth in claim 2 wherein said advanced viewer is a most advanced, current viewer of said movie.

5. A computer server as set forth in claim 1 wherein the determining means determines whether to make said other copy of said movie based on a comparison of estimated times required for two most advanced viewers of said movie to complete their viewing of said movie to a time required to make said other copy of said movie.

6. A computer server as set forth in claim 3 further comprising means for making said other copy of said movie if said determining means determines to make said other copy.

7. A computer server as set forth in claim 1 wherein the determining means determines whether to make said other copy based in part on whether a number of current viewers exceeds a threshold.

8. A computer server as set forth in claim 1 wherein the determining means determines whether to make said other copy based in part on whether a number of current viewers exceeds a threshold and there is another request to view said movie.

9. A computer server as set forth in claim 1 wherein said existing copy or copies of said movie are stored on disk and the determining means determines whether to make said other copy based also on whether said disks have additional bandwidth available to satisfy additional requests to view said movie.

10. A computer server for supplying digital video movies stored on DASD to clients upon demand, said server comprising:

means for allocating existing copy or copies of a digital video movie to requesters to satisfy requests to view said movie; and means, responsive to a subsequent request to view said movie, for determining a level of allocation of said existing copy or copies of said movie, and if said level is greater than a threshold, determining whether to make another copy based on a degree to which an advanced viewer has completed its viewing and a time required to make said other copy.

11. A computer server as set forth in claim 10 wherein if said level is greater than said threshold, the determining means compares a time required to make said other copy of said movie to a time required for said advanced viewer to complete its viewing to determine whether to make said other copy.

12. A computer server as set forth in claim 11 further comprising means for making said other copy of said movie if the time required to make said other copy of said movie is less then the time required for said advanced viewer to complete its viewing of said movie.

13. A method for allocating access to a digital video movie to clients upon demand, said method comprising the steps of:

allocating access to an existing copy or existing copies of a digital video movie to clients to satisfy requests to view said movie; and determining whether to make another copy of said movie based in part on the degree to which current viewer(s) have completed their viewing of said movie and a time required to make said other copy.

14. A method as set forth in claim 13 wherein the determining step determines whether to make said other copy of said movie based on a comparison of an estimated time required for an advanced viewer to complete its viewing of said movie to a time required to make said other copy of said movie.

15. A method as set forth in claim 14 wherein the determining step determines to make said other copy of said movie if the time required to make said other copy is less than the estimated time required for said advanced viewer to complete its viewing.

16. A method as set forth in claim 15 further comprising the step of making said other copy if there is substantial demand for access to said existing copy or copies and said determining step determines to make said other copy.

17. A computer program product for allocating access to a digital video movie to clients upon demand, said computer program product comprising:

a computer readable medium;

first program instruction means for instructing a processor to allocate access to an existing copy or existing copies of a digital video movie to clients to satisfy requests to view said movie;

second program instruction means, responsive to substantial demand for access to said existing copy or copies of said movie, for instructing a processor to determine whether to make another copy of said movie based in part on the degree to which current viewer(s) have completed their viewing of said movie and a time required to make said other copy; and wherein both of said program instruction means are recorded on said medium.

18. A computer program product as set forth in claim 17 wherein said second program instruction means instructs a processor to determine whether to make said other copy of said movie based on a comparison of an estimated time required for an advanced viewer to complete its viewing of said movie to a time required to make said other copy of said movie.

19. A computer program product as set forth in claim 18 further comprising third program instruction means for instructing a processor to make said other copy of said movie if there is substantial demand for access to said existing copy or copies of said movie and the time required to make said other copy is less than the time required for said advanced viewer to complete its viewing, and wherein said third program instruction means is recorded on said medium.

20. A method for supplying digital video movies stored on DASD to clients upon demand, said method comprising the steps of:

allocating existing copy or copies of a digital video movie to requesters to satisfy requests to view said movie; and in response to a subsequent request to view said movie, determining a level of allocation of said existing copy or copies of said movie, and if said level is greater than a threshold, determining whether to make another copy based on a degree to which an advanced viewer has completed its viewing and a time required to make said new copy.

21. A method as set forth in claim 20 wherein if said level is greater than said threshold, the determining step compares a time required to make said other copy to a time required for said advanced viewer to complete its viewing to determine whether to make said other copy.

22. A method as set forth in claim 12 further comprising the step of making said other copy of said movie if said level is greater than said threshold and the time required to make said other copy of said movie is less then the time required for said advanced viewer to complete its viewing of said movie.

23. A computer server for allocating access to a digital video movie to clients for viewing upon demand, said server comprising:

means, responsive to requests to view the movie, for comparing a level of demand to concurrently view the movie to a threshold;

means, responsive to said level being less than said threshold, for allocating access for a current request to an existing copy of the movie stored on one or more disks;

means, responsive to said level exceeding said threshold, for determining whether to make another copy of said movie based in part on the degree to which current viewer(s) have completed their viewing of said movie and a time required to make said other copy; and means for automatically making said other copy on another disk if the determining means determines to make said other copy.

* * * * *